United States Patent [19]

Sasae et al.

[11] Patent Number: 5,387,740
[45] Date of Patent: Feb. 7, 1995

[54] IMMOBILIZATION AGENT FOR INDUSTRIAL WASTE

[75] Inventors: Taiichiro Sasae; Tomio Nishida, both of Nagaokakyo, Japan

[73] Assignee: En-Tech Research Institute Inc., Kyoto, Japan

[21] Appl. No.: 220,393

[22] Filed: Mar. 30, 1994

Related U.S. Application Data

[63] Continuation of Ser. No. 929,794, Aug. 13, 1992, abandoned.

[30] Foreign Application Priority Data

Oct. 23, 1991 [JP] Japan ................................ 3-305303

[51] Int. Cl.6 .............................................. B09B 3/00
[52] U.S. Cl. ................................. 588/257; 106/286.4; 106/287.19; 405/128; 588/256
[58] Field of Search ............... 588/249, 252, 256, 257; 106/286.1, 286.3, 286.4, 286.5, 287.18, 287.19; 405/128, 129, 263, 264, 266

[56] References Cited

U.S. PATENT DOCUMENTS

| 4,116,705 | 9/1978 | Chappell | 588/257 |
| 4,132,558 | 1/1979 | Uchikawa et al. | 588/257 |
| 4,240,952 | 12/1980 | Hulbert et al. | 588/257 |
| 4,274,880 | 6/1981 | Chappell | 588/257 |

FOREIGN PATENT DOCUMENTS

| 133578 | 11/1978 | Japan . |
| 44084 | 4/1981 | Japan . |
| 44085 | 4/1981 | Japan . |

Primary Examiner—David H. Corbin
Attorney, Agent, or Firm—Morgan & Finnegan

[57] ABSTRACT

The immobilization agent for industrial waste according to the present invention is characterized by that it contains cement, ferrous chloride, iron oxalate and amorphous aluminium silicate, and it is preferred said ferrous chloride, iron oxalate and amorphous aluminium silicate are contained in it by mixing ferrous chloride and iron oxalate with amorphous aluminium silicate and granulating and heating the mixture in an inert gas stream. Further, according to the present invention, it may also contain at least one selected from the group consisting of potassium chloride, magnesium chloride, sodium chloride, cobalt chloride, aluminium sulfate, citric acid, calcium chloride and sodium sulfate in addition to the compounds mentioned above.

7 Claims, No Drawings

IMMOBILIZATION AGENT FOR INDUSTRIAL WASTE

This is a continuation of co-pending application Ser. No. 07/929,794, filed on Aug. 13, 1992, now abandoned.

BACKGROUND OF THE INVENTION

The present invention relates to an immobilization agent for industrial waste effective for making harmless industrial waste containing toxic heavy metals.

Conventionally, when industrial waste containing toxic heavy metals were treated, a procedure in which hydraulic cement and the waste was mixed in a weight ratio of 1:1 and water was added and milled together and then cured and solidified to immobilize the toxic heavy metals has been used. At least 150 kg of cement was used for 1 m$^3$ of the waste in the waste treatment in 1977. However, such a treating method by using normal portland cement has various problems and is liable to cause secondary pollution unless the uses are limited.

For example, in the treatment of collected toxic dust exhausted from the workshop such as an electric furnace of steel plant, when a conventional treatment for making the dust harmless (immobilization) is carried out by using cement alone, the toxic metals contained in the collected dust are made lower than the regulated level according to the official leach out inspecting method ( Notification No. 13 of the Environment Agency of Japan) and solidified and capsuled except lead (Pb). At present, however, lead cannot be fixed to the regulated leaching level even if the treating condition such as the amount of cement added is varied and a treatment such as an use in landfilling (reclamation) cannot be carried out.

In the case of sludge containing highly concentrated copper (Cu) and nickel (Ni) discharged from the water-treating equipment of a semiconductor plant is treated by a conventional treating method with cement and determined by the leaching test method adopted by the State of California, U.S., these metals cannot be fixed to the regulated leaching level in U.S. and, at present, secondary pollution problems after the treatment due to the use in landfilling with incomplete treatment has occurred.

Thus, nowadays, regardless of domestic or abroad, it becomes seriously necessary to immobilize the industrial waste containing toxic heavy metals. An immobilization agent for industrial waste which can solidify and capsule (enclose) surely the solidified toxic heavy metals even when used in landfilling or dump to the sea and leaches no toxic heavy metals again and causes no secondary pollution has been required.

The object of the present invention is to provide an immobilization agent for industrial waste which can solve the above-mentioned problems of conventional technologies and can immobilize and capsule surely the industrial waste containing various toxic heavy metals and can make them stable compounds with no second leach out.

SUMMARY OF THE INVENTION

The immobilization agent for industrial waste according to the present invention is characterized by that it contains cement, ferrous chloride, iron oxalate and amorphous aluminium silicate and it is preferred above ferrous chloride, iron oxalate and amorphous aluminium silicate are contained in it by mixing ferrous chloride and iron oxalate with amorphous aluminium silicate and granulating and heating the mixture in an inert gas stream.

According to the present invention, in addition to the compounds mentioned above, it may also contain at least one selected from the following compounds: potassium chloride, magnesium chloride, sodium chloride, cobalt chloride, aluminium sulfate, citric acid, calcium chloride and sodium sulfate.

DETAILED DESCRIPTION OF THE INVENTION

The immobilization agent for industrial waste according to the present invention is made of ferrous chloride ($FeCl_2.nH_2O$), iron oxalate ($FeC_2O_4.2H_2O$) and amorphous aluminium silicate to cement, as the main component. The weight ratio of each components can be properly adjusted and a general weight ratio is 40 to 140 parts by weight of the total of ferrous chloride, iron oxalate and amorphous aluminium silicate per 100 parts by weight of normal portland cement. In the present invention, the weight ratio of ferrous chloride, iron oxalate and amorphous aluminium silicate can be properly adjusted and a ratio of 5 to 30%:5 to 50%:20 to 90% is preferred.

In this case, it is preferable that ferrous chloride, iron oxalate and amorphous aluminium silicate are contained in it by mixing ferrous chloride and iron oxalate with amorphous aluminium silicate as a binder and granulating and heating the mixture in an inert gas stream. For the granulating process, a commercial granulator such as Marumerizer manufactured by Chiyoda Technical industrial Co., Ltd. and Omni-Mixer manufactured by Fuji Paudal Co., Ltd. can be used. The particle size of the granulated product is generally ca. 1 mm. The inert gases usable for the heating treatment performed after granulation include nitrogen ($N_2$) and argon gas (Ar).

Now, the process for the preparation of granules from ferrous chloride, iron oxalate and amorphous aluminium silicate will be illustrated. At first, fine powders of ferrous chloride and iron oxalate are mixed with amorphous aluminium silicate ($SiO_2:Al_2O_3=1:1$ to 2) having a specific surface area of 700 to 900 m$^2$/g to a weight ratio range of 5 to 30% of ferrous chloride, 5 to 50% of iron oxalate and 20 to 90% of amorphous aluminium silicate to give a mixture. The resultant mixture is granulated by using a commercial equipment such as a pan type granulator or Omni-Mixer to a size of ca. 1 mm. During the procedure, oxalic acid (10%) may be dropped to the mixture if required.

Then, the granulate prepared by the above-mentioned process is heated at a temperature range of 50° to 600 ° C. under nitrogen or argon gas stream while moved or rotated for 5 to 30 minutes. The granulate prepared by such a treatment is very high in hygroscopicity (moisture absorption) and hence full notice is required for its storage. Hence, in the case a granulate stored for a long period after heat-treated is reused, it should be heated at a temperature not lower than 120° C. for ca. 30 minutes before use.

Furthermore, in addition to the compounds mentioned above, the immobilization agent for industrial waste according to the present invention may also contain at least one selected from the following compounds: potassium chloride (KCl), magnesium chloride (MgCl$_2$), sodium chloride (NaCl), cobalt chloride (CoCl$_2$), aluminium sulfate (Al$_2$(SO$_4$)$_3$), citric acid ($C_6H_8O_7$), calcium chloride ($CaCl_2$) and sodium sulfate ($Na_2SO_4$).

In the immobilization agent for industrial waste according to the present invention containing the above-mentioned compounds additionally, it is preferred to be constituted within a range of 0.05 to 0.35% of potassium chloride, 0.03 to 0.20% of magnesium chloride, 0.03 to 0.20% of sodium chloride, 0.0002 to 0.01% of cobalt chloride, 0.05 to 0.5% of aluminium sulfate, 0.0002 to 0.01% of citric acid, 0.03 to 0.25% of calcium chloride and 0.001 to 0.02% of sodium sulfate.

Thus, the immobilization agent for industrial waste according to the present invention may contain the granulate having the composition mentioned above and cement. In this case, 40 to 140 parts by weight of the above-mentioned granulate is incorporated to 100 parts by weight of a normal portland cement.

Now, the functional mechanism of the immobilization agent for industrial waste according to the present invention will be illustrated. In case of the immobilization agent of the present invention is mixed with industrial waste containing toxic heavy metals, the above-mentioned compounds react with calcium contained in the cement to form needle crystals of Ettringite ($3CaO \cdot Al_2O_3 \cdot CaSO_4 \cdot 32H_2O$) from calcium silicate and further an ion exchange reaction occurs between the toxic heavy metals contained in the industrial waste and the divalent cations mainly. As the result, the toxic heavy metals are immobilized and capsuled surely in the crystals and leach out is prevented.

In case of the immobilization agent for industrial waste according to the present invention is used, more advantageous functions can be obtained at the following aspects than in the case industrial waste is treated by a conventional method using cement alone. Thus, the aspects include that it is constituted by substances which crystallize Ettringite in early stage, that substances for constituting Ettringite crystals are contained in large amounts and that the atmosphere is a reductive one.

The immobilization agent for industrial waste according to the present invention contains ferrous chloride, iron oxalate and amorphous aluminium silicate in addition to cement. These compounds improve the chemical reaction and ion exchange reaction related to the toxic heavy metals. In case of ferrous chloride content is lower than 5% and iron oxalate content is lower than 5%, the oxidation-reduction reaction does not proceed and no ion solidification is performed. Reversely, in case of the weight ratios of ferrous chloride and iron oxalate exceed respectively 30 and 50%, the mixture cannot be granulated to a size of ca. 1 mm by a commercial granulator. The formation of Ettringite crystals after the reaction is also low and the toxic heavy metals are not capsuled in the crystals disadvantageously.

It is preferable that the content of the amorphous aluminium silicate is in the above-mentioned range from the viewpoint of the amount of Ettringite crystals formed from calcium silicate required for immobilizing and capsuling the heavy metals.

Furthermore, compounds such as sodium chloride, magnesium chloride and potassium chloride may be added to the immobilization agent for industrial waste according to the present invention to crystallize in early stage. In this case, however, their amount added should be carefully determined. Because various disadvantages that they do not attribute as a rapid binder but revesely cracks are formed in the crystals and the ion exchange reaction does not proceed actively when the amount added is out of the above-mentioned range occur.

In the present invention, the formation of Ettringite crystals can be increased by adding the constitutional components such as sodium sulfate and calcium chloride in the weight ratio mentioned above to capsule and immobilize more heavy metals. In case of sodium sulfate and calcium chloride are respectively less than 0.001% and 0.03%, no rapid curing effect cannot be attained. Reversely, in case of sodium sulfate and calcium chloride are added respectively in amounts of more than 0.2% and 0.25%, the product becomes poor in the long-term stability of the strength after immobilization to form cracks in the solidified product and to make it brittle.

Furthermore in the present invention, when citric acid and cobalt chloride are added, these compounds acts catalytically to activate the process of hydration reaction of ions such as calcium, alumina and silicic acid during the formation of Ettringite. In case of citric acid is less than 0.0002%, however, inorganic metal salts become hardly soluble. Reversely, when it is more than 0.01%, too much organics prevent cementation. Ions dissolved during the hydration do not act actively when cobalt chloride is less than 0.0002%, while no improvement in the effect of activation of ion activity is observed and the method becomes more expensive when it is more than 0.01%.

The effect of immobilization in the treating mechanism when the immobilization agent for industrial waste according to the present invention is used is particularly remarkable in the immobilization of hexavalent chromium ($CrO_4^{2-}$) compared to the conventional case cement alone is used. Thus, in the immobilization agent of the present invention, amorphous aluminium silicate contained in the immobilization agent reacts with hexavalent chromium ($Cr^{6+}$) contained in the industial waste to form crystals of chromate Ettringite and thus hexavalent chromium can be more surely immobilized and capsuled.

Of course, for the other toxic heavy metals, ion exchange reaction of divalent cations occurs more than in case of the conventional method in which cement alone is used, and they are immobilized and capsuled in the Ettringite crystals.

Furthermore, the immobilization agent for industrial waste according to the present invention maintains a reductive atmosphere in the initial stage of the reaction and hence hexavalent chromium ($Cr^{6+}$) is reduced to trivalent chromium ($Cr^{3+}$) and becomes to react with compounds such as calcium hydroxide more easily. Therefore, the reduced trivalent chromium is precipitated, immobilized and capsuled in the form of hydroxide as stabilized compounds such as chromium hydroxide ($Cr(OH)_3$ or $Cr_2O_3 \cdot xH_2O$). The chemical reaction in this case is as follows.

$$Cr_2O_7^{2-} + 14H^+ + 6e^- \rightarrow 2Cr^{3+} + 7H_2O$$
(Reduction)

$$Cr^{3+} + 3OH^- \rightarrow Cr(OH)_3$$

The immobilization agent for industrial waste according to the present invention is also suitable for the treatment of industrial waste discharged from the water-treating equipments of a semiconductor plant and a metal plating plant containing high concentrations of copper (Cu), silver (Ag) and mercury (Hg). In this case, substitution reactions proceed between the metals such as copper, silver and mercury mentioned above and the highly surface-active iron-granulate contained in the immobilization agent according to the present invention by ionization tendency and they are reduced to deposit as metals and capsuled during the immobilization and formation of calcium silicate crystals and the like. Such an effect of immobilization treatment is observed especially remarkably in the metals of high standard single electrode potential such as copper, silver and mercury.

In addition, the immobilization agent for industrial waste according to the present invention acts effectively also on the stabilization of arsenic (As). Thus, arsenic is present as arsenious acid ($As_2O_3$) in general and included and solidified in the crystals by a coprecipitation with calcium hydrate during the hydration reaction when it is treated by the conventional method using cement alone. However, as the arsenious acid is in a somewhat unstable combination form before the treatment, it cannot be surely coprecipitated in some cases. On the contrary, when the immobilization agent for industrial waste according to the present invention is used, arsenious acid can be converted to arsenic pentoxide ($As_2O_5$) by the oxidation ($Fe^{2+} \rightarrow Fe^{3+}$) and ferritation of iron ion to stabilize the combination form and to improve coprecipitation rate. In addition, arsenic can be completely stabilized by coprecipitation with iron hydroxide ($Fe(OH)_3$) formed by the hydration reaction.

Thus, by using the immobilization agent for industrial waste according to the present invention, industrial wastes containing toxic heavy metals such as slurry sludges and dehydrated cake sludges discharged after treatments of various waste liquors from a semiconductor plant and a metal plating plant, collected toxic dust for working environment maintainance in the workshop such as an electric furnace melting kiln in a steel-making plant or polluted soil due to the use in landfilling can be immobilized. The toxic heavy metals are completely solidified by the process and not leached out at all.

PREFERRED EMBODIMENTS OF THE INVENTION

The present invention will be illustrated by Examples in more details as follows. However, the present invention is not restricted to them.

EXAMPLE 1

Treatment of a Collected Dust 25 parts by weight of finely powdered ferrous chloride, 25 parts by weight of finely powdered ferrous oxalate and 50 parts by weight of amorphous aluminium silicate were mixed together thoroughly and a granulate of a size of ca. 1 mm was prepared by using a commercial granulator. The granulate thus prepared was heated at 400° C. for 30 minutes and then 49.48 parts by weight of cement, 0.20 part by weight of potassium chloride, 0.10 part by weight of magnesium chloride, 0.10 part by weight of calcium chloride, 0.005 part by weight of cobalt chloride, 0.005 part by weight of citric acid, 0.01 part by weight of sodium sulfate, 0.10 part by weight of sodium chloride and 0.50 part by weight of aluminium sulfate were added to it and they were mixed together uniformly to prepare an immobilization agent for industrial waste according to the present invention. On the other hand, cement was used as the treating material for the conventional technology.

Treating Method 100 kg of the immobilization agent for industrial waste according to the present invention were added to 1 $m^3$ of collected dust discharged from a steel-making plant and 375 kg of water were added to the mixture and the mixture was milled and cured and solidified. In comparison with it, 200 kg of cement were added to 1 $m^3$ of the above-mentioned collected dust as the conventional technology and 500 kg of water were added to the mixture and cured and solidified.

Then, the effects of the immobilization by using these immobilization agents were compared by the leaching detecting method described in the Notification No. 13 of the Environment Agency (Japan). The results of the experiment are shown in Table 1 below. Table 1 also shows the amounts of various toxic metals contained in the collected dust used in the experiment, the leached out amount in the untreated and the regulated level in Japan.

TABLE 1

Example 1:
Treatment of a collected dust (in Japan)
Conventional technology:
200 kg of cement were added to 1 $m^3$ of the collected dust.
Method using the immobilization agent for industrial waste according to the present invention:
100 kg of the immobilization agent for industrial waste according to the present invention were added to 1 $m^3$ of the collected dust.

| Item | Unit | As | Cd | $Cr^{6+}$ | Cu | Fe | Mn | Ni | Pb | Zn | F | T-Hg | CN |
|---|---|---|---|---|---|---|---|---|---|---|---|---|---|
| Amounts of various toxic metals contained in the dust | mg/dry · kg | 5.81 | 51.0 | 1840 | 763 | 327000 | 20200 | 342 | 9050 | 124000 | 1200 | 0.64 | <1 |
| Leached out amount in the untreated | mg/l | 1.50 | 0.09 | 89.1 | 0.05 | 0.60 | 0.10 | 0.13 | 58.1 | 2.45 | 8.0 | 0.45 | <0.1 |
| Leached out amount after the conventional technology was used | mg/l | 0.30 | <0.01 | 11.0 | 0.03 | 0.23 | 0.02 | <0.05 | 16.1 | 0.05 | 1.5 | 0.031 | <0.1 |
| Leached out amount after the immobilization agent for industrial waste according to the present invention was used | mg/l | <0.01 | <0.01 | <0.025 | 0.02 | 0.11 | 0.02 | <0.05 | 0.24 | 0.05 | 1.4 | <0.0005 | <0.1 |
| Regulated level | mg/l | <0.5 | <0.1 | <0.5 | <3 | — | — | — | <1 | <5 | <15 | <0.005 | <1 |

Notification No. 13 of the Environment Agency (Japan)

From the experimental results shown in Table 1, the immobilization agent for industrial waste according to the present invention shows excellent immobilizing and capsuling effect on all toxic heavy metals and gives particularly remarkable effect on arsenic, hexavalent chromium, lead and mercury compared to the conventional method using cement alone.

EXAMPLE 2

Treatment of a Wet Sludge

The immobilization agent for industrial waste according to the present invention was prepared by the same manner as in Example 1 and cement was used as the treating material for the conventional technology.

Treating Method 500 kg of the immobilization agent for industrial waste according to the present invention were added to 1 m³ of a wet sludge discharged from an IC plant and 300 kg of water were added to it and the mixture was milled and cured and solidified. In comparison with it, 500 kg of cement were added to 1 m³ of the wet sludge mentioned above as the conventional technology and 300 kg of water were added to the mixture and milled and cured and solidified.

Then, the effects of the immobilization treatment by using these treating agents were compared by the leaching detecting method adopted by the State of California (California Wet Extraction Test Method). The results of the experiment are shown in Table 2 below. Table 2 also shows the amounts of toxic metals contained in the wet sludge used in the experiment, the leached out amount in the untreated and the regulated level in U.S.

tional method using cement alone. Particularly, the immobilizing and capsuling effect on copper is highly excellent compared to the conventional method using cement alone. Nickel could be lowered to a level not higher than the regulated level.

EXAMPLE 3

Treatment of Incinerator Ash

Treating Method 300 kg of the immobilization agent for industrial waste according to the present invention prepared by the same procedure as in Example 1 were added to 1 m³ of incinetator ash discharged from a incinerator in The Netherlands and 390 kg of water were added to the mixture and the mixture was milled and cured and solidified. Then, the effect of the stabilization treatment by using this immobilization agent was evaluated by the leached out detecting method (Availability Test). The results of leaching at pHs of 4 and 7 are shown in Table 3 below. Table 3 also shows the amounts of toxic metals contained in the incinerator ash used in the experiment and the regulated level in The Netherlands.

TABLE 3

Example 3: Treatment of incinerator ash (in The Netherlands)

| Item | Unit | pH | As | Cd | $Cr^{6+}$ | Cu | Fe | Mn | Ni | Pb | Zn |
|---|---|---|---|---|---|---|---|---|---|---|---|
| Content | mg/dry · kg | 11.42 | 22.7 | 251 | 400 | 1030 | 11400 | 540 | 102 | 1770 | 13700 |
| Leached out | mg/l | 4 | 0.01 | 0.72 | 0.06 | 2.33 | 0.25 | 0.79 | 0.19 | 4.72 | 44.8 |
| amount | | 7 | 0.01 | 0.07 | 0.26 | 0.02 | 0.22 | 0.04 | 0.15 | 0.01 | 1.40 |
| Regulated level | mg/l | — | 20 | 0.8 | 100 | 30 | — | — | 20 | 100 | 100 |

Detecting method: Availability Test

On the other hand, the above-mentioned incinerator ash was treated by the conventional method by using cement alone in place of the immobilization agent for industrial waste according to the present invention. The leached out amount of cadmium (Cd) was 1.81 ppm at pH of 4 and 0.34 ppm at pH of 7.

From the experimental results shown in Table 3, when the immobilization agent for industrial waste according to the present invention was used, it was confirmed that all toxic heavy metals were completely

TABLE 2

Example 2:
Treatment of a wet sludge discharged from an IC plant (in U.S.A)
Conventional technology:
500 kg of cement were added to 1 m³ of the wet sludge.
Method using the immobilization agent for industrial waste according to the present invention:
500 kg of the immobilization agent for industrial waste according to the present invention were added to 1 m³ of the wet sludge.

| Item | Unit | As | Cd | $Cr^{6+}$ | Cu | Fe | Mn | Ni | Pb | Zn |
|---|---|---|---|---|---|---|---|---|---|---|
| Amounts of various toxic metals contained in the dust | mg/dry · kg | 4.36 | 3.16 | 117 | 13400 | 52000 | 516 | 2040 | 535 | 498 |
| Leached out amount in the untreated | mg/l | 2.23 | 0.21 | 12.5 | 564 | 30.1 | 4.00 | 81.2 | 5.05 | 53.4 |
| Leached out amount after the conventional technology was used | mg/l | 1.25 | 0.10 | 5.20 | 232 | 27.9 | 2.10 | 22.0 | 3.73 | 4.00 |
| Leached out amount after the immobilization agent for industrial waste according to the present invention was used | mg/l | 0.10 | 0.11 | 2.56 | 7.85 | 29.8 | 1.70 | 16.8 | 1.34 | 4.40 |
| Regulated level | mg/l | <5.0 | <1.0 | <560 | <25 | — | — | <20 | <5.0 | <250 |

Detecting method: California Wet Extraction Test Method (U.S.A.)

From the experimental results shown in Table 2, the immobilization agent for industrial waste according to the present invention shows excellent immobilizing and capsuling effect on all toxic heavy metals and gives particularly remarkable effect on arsenic, hexavalent chromium, copper and lead compared to the conventional method using cement alone.

immobilized and capsuled below the regulated level.

When industrial waste containing toxic heavy metals is treated with the immobilization agent for industrial waste according to the present invention, the toxic heavy metals are completely immobilized and and not leached out. Thus, the immobilization agent for industrial waste according to the present invention is highly effective for the immobilization of industrial waste.

What is claimed is:

1. An immobilization agent for toxic heavy metals wherein said immobilization agent is mixed in sufficient amounts with said heavy metals to solidify said mixture, said immobilization agent comprising 100 parts by weight of cement and 40 to 140 parts by weight of the mixture of ferrous chloride, iron oxalate and amorphous aluminum silicate and in which the ratio of ferrous chloride: iron oxalate: amorphous aluminum silicate is 5 to 30% by weight: 5 to 50% by weight: 20 to 90% by weight.

2. An immobilization agent according to claim 1, in which said ferrous chloride, iron oxalate and amorphous aluminum silicate are contained as a granulate prepared by a procedure in which ferrous chloride and iron oxalate are mixed together with amorphous aluminum silicate and granulated and heated in an inert gas stream.

3. An immobilization agent according to claim 1 or 2, which contains at least one selected from the group consisting of 0.05 to 0.35% by weight of potassium chloride, 0.03 to 0.20% by weight of magnesium chloride, 0.03 to 0.20% by weight of sodium chloride, 0.0002 to 0.01% by weight of cobalt chloride, 0.05 to 0.5% by weight of aluminum sulfate, 0.0002 to 0.01% by weight of citric acid, 0.03 to 0.25% by weight of calcium chloride and 0.001 to 0.02% by weight of sodium sulfate in addition to the compound mentioned above.

4. A process for the immobilization of toxic heavy metals contained in industrial waste comprising the steps of: (a) mixing 100 parts by weight of cement and 40 to 140 parts by weight of the mixture consisting of 5 to 30% by weight of ferrous chloride, 5 to 50% by weight of iron oxalate and 20 to 90% by weight of amorphous aluminum silicate to prepare a granulate; (b) adding the granulate to water and the industrial waste to form a mixture; and (c) milling, curing and solidifying the mixture.

5. A process according to claim 4, in which said granulate of ferrous chloride, iron oxalate and amorphous aluminum silicate is prepared by first mixing ferrous chloride and iron oxalate together with amorphous aluminum silicate and subsequently heating said mixture in an inert gas stream.

6. A process according to claim 5, in which said heating step is conducted at a temperature of about 50° to 600° C. under nitrogen or argon gas stream while agitated for about 5 to 30 minutes.

7. A process according to claims 4, 5 or 6, which contains at least one selected from the group consisting of 0.05 to 0.35% by weight of potassium chloride, 0.03 to 0.20% by weight of magnesium chloride, 0.03 to 0.20% by weight of sodium chloride, 0.0002 to 0.01% by weight of cobalt chloride, 0.05 to 0.5% by weight of aluminum sulfate, 0.0002 to 0.01% by weight of citric acid, 0.03 to 0.25% by weight of calcium chloride and 0.001 to 0.02% by weight of sodium sulfate is added to said granulate.

* * * * *